(12) United States Patent
Iwasaki

(10) Patent No.: US 8,538,149 B2
(45) Date of Patent: Sep. 17, 2013

(54) DATA PROCESSING APPARATUS, IMAGE REGISTRATION METHOD, AND PROGRAM PRODUCT

(75) Inventor: Masajiro Iwasaki, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1264 days.

(21) Appl. No.: 11/984,956

(22) Filed: Nov. 26, 2007

(65) Prior Publication Data

US 2008/0158612 A1 Jul. 3, 2008

(30) Foreign Application Priority Data

Nov. 29, 2006 (JP) ................................ 2006-321943

(51) Int. Cl.
*G06K 9/34* (2006.01)

(52) U.S. Cl.
USPC .......... 382/173; 382/164; 382/165; 358/3.26; 358/1.9

(58) Field of Classification Search
USPC ........ 382/173, 184, 199, 164, 165; 358/3.26, 358/1.9
See application file for complete search history.

(56) References Cited

U.S. PATENT DOCUMENTS

| | | | |
|---|---|---|---|
| 6,711,287 | B1 | 3/2004 | Iwasaki |
| 6,853,374 | B2 | 2/2005 | Iwasaki |
| 7,023,446 | B1 | 4/2006 | Iwasaki |
| 2001/0012399 | A1 | 8/2001 | Tohyama et al. |
| 2003/0020974 | A1 * | 1/2003 | Matsushima ................. 358/521 |
| 2004/0024758 | A1 | 2/2004 | Iwasaki |
| 2004/0161163 | A1 | 8/2004 | Takamidoh |
| 2005/0195317 | A1 | 9/2005 | Myoga |
| 2006/0082849 | A1 | 4/2006 | Kaku |

FOREIGN PATENT DOCUMENTS

| | | |
|---|---|---|
| EP | 1 349 371 A2 | 10/2003 |
| JP | 2000-197044 | 7/2000 |
| JP | 2000-261774 | 9/2000 |
| JP | 2003-163803 | 6/2003 |
| JP | 2003-281526 A | 10/2003 |
| JP | 2003-303188 | 10/2003 |
| JP | 2004-021720 | 1/2004 |
| JP | 2004-240692 | 8/2004 |
| JP | 2005-333519 | 12/2005 |

OTHER PUBLICATIONS

Fuji et al: JP2003-303188, English version translated by machine.*
Nakanishi et al: JP2003-163803, English version translated by machine.*
Ichikawa et al: JP2004-021720, English version translated by machine.*

* cited by examiner

*Primary Examiner* — Samir A. Ahmed
*Assistant Examiner* — Ruiping Li
(74) *Attorney, Agent, or Firm* — Dickstein Shapiro LLP

(57) ABSTRACT

A data processing apparatus for registering image data includes a network processing unit configured for acquiring image data through a network, an image correction unit for analyzing the image data, extracting a background image and a subject image from the image data, and correcting the extracted background image according to a correction condition, and a database unit for storing the corrected image data such that the image data is associated with the corrected image data.

17 Claims, 17 Drawing Sheets

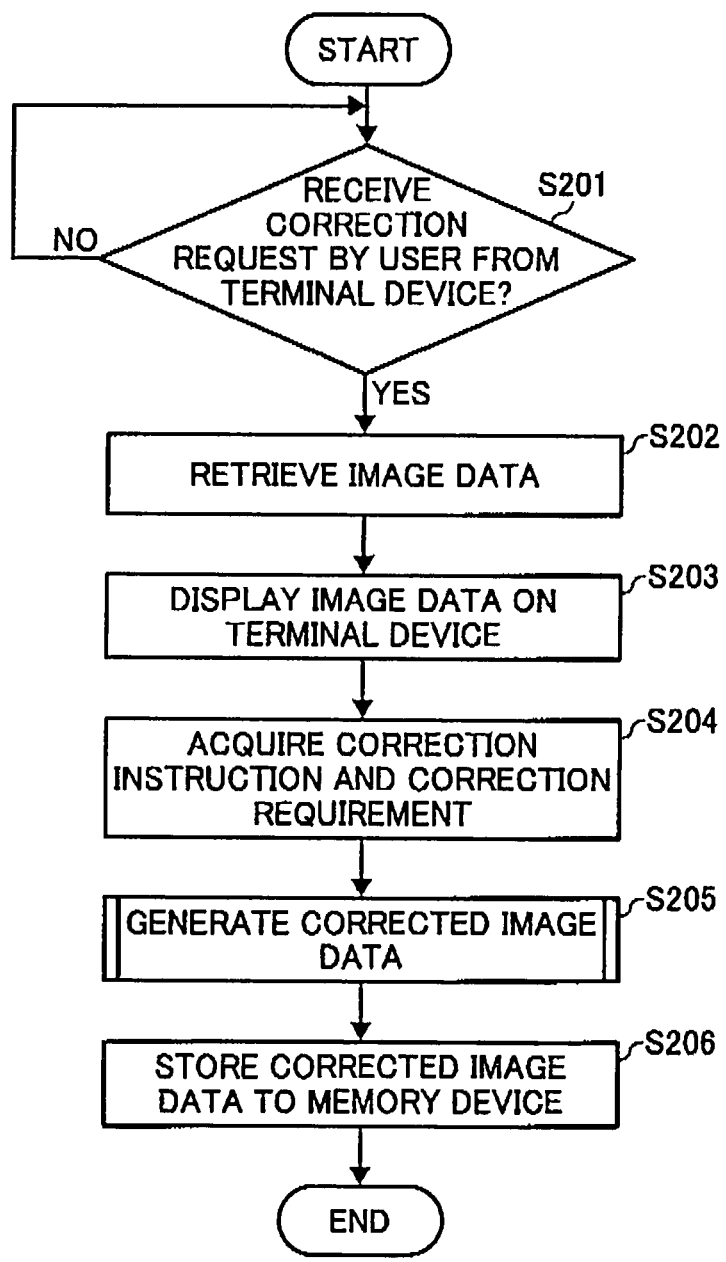

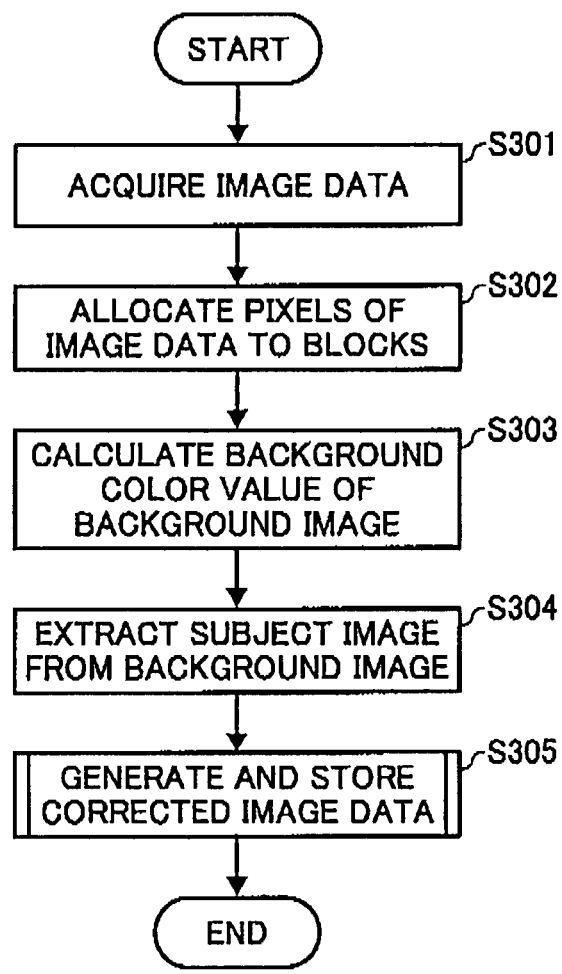

DATA PROCESSING APPARATUS, IMAGE REGISTRATION METHOD, AND PROGRAM PRODUCT

CROSS-REFERENCE TO RELATED APPLICATION

The present patent application claims priority under 35 U.S.C. §119 from Japanese Patent Application No. 2006-321943 filed on Nov. 29, 2006 in the Japan Patent Office, the entire contents and disclosure of which are hereby incorporated by reference herein.

BACKGROUND OF THE INVENTION

1. Field of the Invention

Preferred embodiments of the present invention generally relate to an image correction technique, and more particularly to a data processing apparatus, an image registration method, and a program product that corrects image data and registers corrected image data in the data processing apparatus.

2. Discussion of the Related Art

Related-art data processing apparatuses register image data transmitted through a network to a database and correct the image data to allow a user to browse the corrected image data in the network. Not only a personal computer but also a cellular phone camera, a PDA (Personal Data Assistant), or a digital camera may register image data to a data processing apparatus and use the image data through a network by accessing the network. A user can browse corrected image data in a variety of network services such as an Internet shopping service, a weblog, a printing service, a facsimile service, and so forth.

In such a data processing apparatus, image quality varies due to different image acquisition sources. For example, when a plurality of images is displayed on a web page, it is difficult to show the images in the same image quality. In order to improve quality in network services, it is preferable to show different images after being corrected.

A technique has been proposed for automatically performing image correction on image data to avoid image quality deterioration. After the image correction, the technique determines whether or not resizing a size of the corrected image data is required depending on whether a forwarding address of corrected image data is a cellular phone or another terminal device.

However, such a technique has a drawback in that a user cannot determine whether or not image correction is required or cannot issue an instruction to correct image data to a data processing apparatus. In addition, the user cannot select a correction condition to be performed on registered image data and cannot browse image data before correction or corrected image data by using browser software. Moreover, the user cannot correct image data transmitted from a cellular phone, a PDA, a digital camera, or the like, on a monitor of a personal computer externally connected to a data processing apparatus through a network.

SUMMARY OF THE INVENTION

The present invention describes a novel data processing apparatus. In one preferred embodiment, a data processing apparatus configured to register image data includes a network processing unit configured to acquire image data through a network, an image correction unit configured to analyze the image data, extract a background image and a subject image from the image data, and correct the extracted background image according to a correction condition, and a database unit configured to store the corrected image data such that the image data is associated with the corrected image data.

The present invention further describes a novel image registration method. In one preferred embodiment, an image registration method configured to register image data to a data processing apparatus through a network includes the steps of receiving image data from a terminal device through the network, dividing the image data into background image data and subject image data by analyzing the image data, storing the background image data and the subject image data in a memory, correcting the background image data stored in the memory, generating corrected image data to include the subject image data according to a correction condition, storing the corrected image data in a database, receiving a registered image display request through the network, examining whether or not the corrected image data is registered in the database by analyzing the registered image display request, and displaying the corrected image data when the corrected image data is registered or the image data without correction when the corrected image data is not registered. The image registration method is performed by a data processing apparatus.

The present invention further describes a novel computer program product. In one preferred embodiment, a computer program product configured to register image data includes the steps of acquiring image data through a network, analyzing the image data, extracting a background image and a subject image from the image data, correcting the extracted background image according to a correction condition, and storing the corrected image data such that the image data is associated with the corrected image data. The computer program product is stored on a computer-readable storage medium and runs on a data processing apparatus.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9 is a flowchart of an example of processing performed by the data processing apparatus when the data processing apparatus receives a correction request from an external device;

FIG. 10 is a flowchart of an example of image correction processing performed by the data processing apparatus 10;

DETAILED DESCRIPTION OF THE PREFERRED EMBODIMENTS

Figure 1:
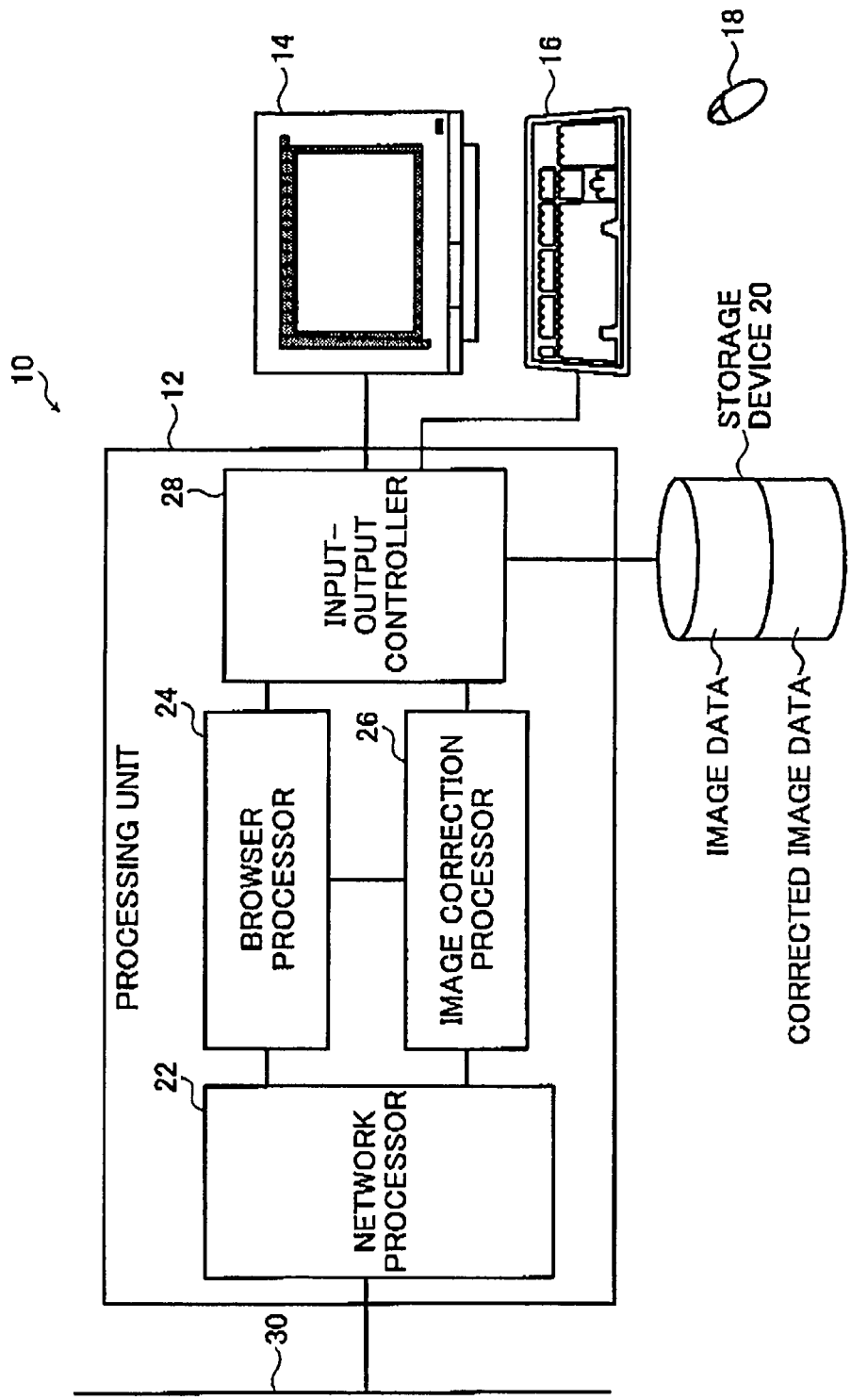
FIG. 1 is a block diagram of a data processing apparatus according to a preferred embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner.

Referring now to the drawings, wherein like reference numerals designate identical or corresponding parts throughout the several views, preferred embodiments of the present invention are described. It should be noted that the present invention is not limited to any preferred embodiment described in the drawings.

Figure 2:
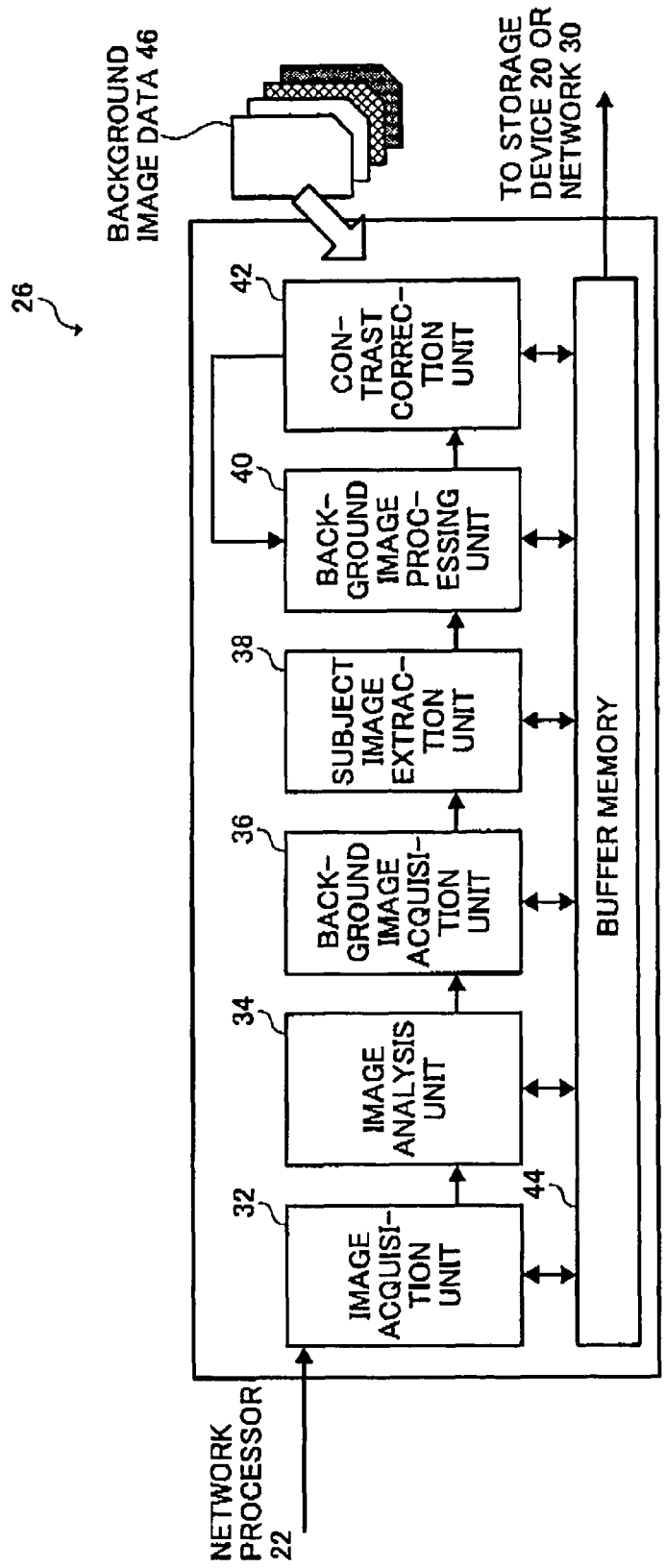
FIG. 2 is a block diagram of an image correction processor according to a preferred embodiment of the present invention.

Referring to FIGS. 1 and 2, a description is given of a data processing apparatus according to a preferred embodiment of the present invention.

FIG. 1 shows a block diagram of a data processing apparatus 10 for correcting image data. The data processing apparatus 10 is configured as a personal computer, a workstation, or a computer to serve as a server. The data processing apparatus 10 includes a central processing unit (CPU), a cache memory that enables quick-access of data to be processed by the CPU, and a memory formed of a solid-state memory element such as a RAM, a DRAM, or the like, that enables the CPU to perform processing.

More specifically, as for the CPU employed by the data processing apparatus 10, a compatible CPU with PENTIUM (registered trademark) such as PENTIUM (registered trademark) through PENTIUM (registered trademark) IV, ATHRON (registered trademark), CELERON (registered trademark), or the like, or a CPU having a CISC (Complex Instruction Set Computer) or RISC (Reduced Instruction Set Computer) architecture such as POWER PC (registered trademark), MIPS (registered trademark), or the like, can arbitrarily be selected and mounted in the data processing apparatus 10 according to required throughput of the CPU or a packaging type of a platform to be used in the data processing apparatus 10.

As for an operating system (OS), the data processing apparatus 10 can employ MacOS (registered trademark), Windows (registered trademark), Windows (registered trademark) 200×Server, UNIX (registered trademark), AIX (registered trademark), LINUX (registered trademark), or another appropriate OS, The data processing apparatus 10 stores and executes an application program written in an object-oriented programming language such as C, C++, Visual C++, VisualBasic, Java (registered trademark), JAVA (registered trademark) SCRIPT, Perl, Ruby, or the like, which operates in the above OS. When functioning as a server, the data processing apparatus 10 can be configured as a web server such as a CGI (Common Gateway Interface) server, an application server, a SOAP (Simple Object Access Protocol) server, or the like, which supports server software such as Apache, IIS (Internet Information Server), CGI, or the like, and performs image registration, image correction, or the like, requested by using an HTTP (HyperText Transfer Protocol) protocol, an FTP (HyperText Transfer Protocol) protocol, or an SMTP (Simple Mail Transfer Protocol) protocol.

As shown in FIG. 1, the data processing apparatus 10 includes processing unit 12, a display device 14, an input device 16 such as a keyboard for sending a variety of instructions to the processing unit 12, and a pointing device 18 such as a mouse. The processing unit 12 receives input from the keyboard 16 or the mouse 18 via an input-output controller 28 and executes instructed processing. The processing unit 12 also displays a processing result or downloaded image data on the display device 14 via the input-output controller 28.

The data processing apparatus 10 further includes a browser processor 24 and an image correction processor 26. The browser processor 24 is mounted as server software such as servlet, Apache, IIS (Internet Information Server), or the like. The browser processor 24 sends a structured document written in an HTML, an XML (Extensible Markup Language), or the like, to browser software such as Internet Explorer (registered trademark), Netscape Navigator, Mozilla, or the like. The browser software displays the structured document, which is sent to a terminal device externally connected to the data processing apparatus 10 through a network 30, on the terminal device as a web page, thereby enabling the data processing apparatus 10 to provide a variety of services to the terminal device.

The browser processor 24 processes a transaction such as an HTTP request/response, an FTP request/response, or the like, via a network processor 22 including a network device of a data link layer level such as an NIC (Network Interface Card) based on an OSI (open Systems Interconnection) basic reference model through the network 30 including a LAN (Local Area Network), a WAN (Wide Area Network), or the Internet, thus enabling the structured document to be browsed by using the browser software on the display device 14. The browser processor 24 may route through another network device of a data link layer level or a network layer level to connect to the Internet, or may connect to a terminal device via a DNS (Domain Name Server), a POP (Post Office Protocol) server, or the like. In addition, the browser processor 24 includes an applet and can cause browser software of a terminal device to execute an applet by embedding an applet calling tag of <applet> or <object> in a structural document.

The image correction processor 26 performs image correction on image data acquired by a digital camera, a cellular phone camera, or the like, and then stores the image data and the corrected image data subjected to image correction in a storage device 20. The processing unit 12 includes a database means such as a relational database, and manages image data and corrected image data in such a way that a user can browse both the image data and the corrected image data.

FIG. 2 is a block diagram showing in detail functions of the image correction processor 26 shown in FIG. 1. The image correction processor 26 includes an image acquisition unit 32 and an image analysis unit 34. The image acquisition unit 32 acquires image data taken by a digital camera or the like through a bus-type transmission path including Ethernet (registered trademark) and stores the image data to a buffer memory 44.

The image analysis unit 34 allocates the image data acquired by the image acquisition unit 32 to corresponding blocks, and calculates a mean color value with respect to each of the blocks by averaging RGB data of picture elements (pixels) included in each of the blocks. The mean color value is calculated in RGB dimension and may be used in a subsequent processing without conversion. Alternatively, the mean color value in RGB dimension can be converted into CIE 1976 L*a*b color system. The mean color value can be subjected to statistical processing such that slight deviations (for instance, dust or shadow) in the mean color value of each of the blocks do not affect separation of a background image and a subject image. Hereinafter, to facilitate description, statistical processing using an RGB color system, which is an additive color mixture system, is used. However, it should be noted that the same processing can be carried out using a CMY color system, which is subtractive color mixture system.

In another method of the present embodiment according to the present invention, after allocating image data to corresponding blocks, the image analysis unit 34 may perform texture analysis of each of the blocks by performing a Fourier transformation on the texture of each of the blocks and converting the texture into a spatial frequency spectrum.

A background image acquisition unit 36 calculates a background color value of the image data acquired by the image acquisition unit 32 from the locks allocated by the image analysis unit 34. The background image acquisition unit 36 calculates the background color value from n blocks around the four corners of the image data by averaging mean color values of the n blocks. In order to determine the value of n, the background image acquisition unit 36 picks up one to five blocks around the corner in one direction of the image data, that is to say, four to twenty blocks around the corners in the four directions, averages mean color values of the picked up blocks, and calculates a variance and an unbiased estimate of population variance by using the averaged mean color value. Then, the background image acquisition unit 36 determines the value of n such that a difference between the variance and the unbiased estimate of population variance is equal to or less than a predetermined threshold value. At the same time, the background image acquisition unit 36 calculates a standard deviation of the mean color values of the n blocks and can use the standard deviation for distinguishing an object of the image data, since it is supposed that the corners are formed so as not to include the object. The background color value calculated by the background image acquisition unit 36 is temporarily stored in the buffer memory 44. A subject image extraction unit 38 reads and uses the background color value for extracting pixels corresponding to the object of the image data.

When performing texture analysis, another preferred embodiment according to the present invention acquires filter data characterized by a series of frequencies forming a spatial frequency spectrum around the corners of the image data and can identify blocks around the corners as a background image by referring to the filter data.

The subject image extraction unit 38 includes an extraction mechanism, implemented as software or as hardware as required, for extracting a background image and a subject image by using an image characteristic of the image data. As the image characteristic, RGB color values, CMY color values, values of CIE 1976 L*a*b color system, or a spatial frequency spectrum of texture can be used, although the present invention is not limited to these image characteristics.

In addition, the present embodiment may use a plurality of types of processing methods such as a snake method, a texture analysis method, and so forth as the extraction mechanism.

The snake method is a method to extract a subject image by using the background color value and the standard deviation of the mean color values of the n blocks picked up to calculate the background color value, which are calculated by the background image acquisition unit 36. From the corners to an inside of an image, each mean color value of each block is compared with the background color value. When a mean color value of a block is more than one standard deviation of the background color value, blocks from the corners to a block before the block are determined as a background image, and thus the subject image is distinguished from the background.

The texture analysis method is a method to specify an area having a specific frequency as a subject image area by transforming RGB values of image data to frequencies using a Fourier transformation. The texture analysis may be performed by applying a Fourier transformation to mean color values of blocks of image data after the image data is allocated to the blocks or to image data directly without allocation to blocks. When the texture analysis method is employed, a background image and a subject image can be separated by filtering with a frequency range to distinguish the background image.

A background image processing unit 40 performs processing that changes a color value of the background image with respect to the extracted subject image. As shown in FIG. 2, the image correction processor 26 stores background image data 46 including a plurality of background images having different RBG color values (CMY color values or values of CIE 1976 L*a*b color system) in an appropriate storage device. The background image data 46 can include a window ornament, a frame ornament, or the like, and can modify a color of the background image or add an ornament to the background image in response to access by the background image processing unit 40.

The background image processing unit 40 modifies an area outside a subject image of image data by using one of the following methods 1 to 3. In the present preferred embodiment, processing to modify a color value of a background image, which is described in method 2, can be performed by using a software program.

In method 1, a lower layer of a background image selected from the background image data 46 and an upper layer of a subject image of image data are superimposed and combined to form new image data. A data size of the background image selected from the background image data 46 as the lower layer is resized to a same size as the original image data. Then, the image data formed of the superimposed and combined layers is converted to data in a format such as GIF (Graphic Interchange Format), JPEG (Joint Photographic Experts Group), JPEG2000, PNG (Portable Network Graphics), TIFF (Tagged Image File Format), or the like.

In method 2, a background image is corrected by modifying color values of all blocks of the background image to an RGB value of a specified pixel in a block that is identified as the background image. Then, image data with the corrected background image is converted to data in an appropriate format.

In method 3, a lower layer of a background image selected from the background image data 46 and an upper layer of an original image are superimposed and combined to form image data. A data size of the background image selected from the background image data 46 as the lower layer is resized to a same size as the original image data. Then, a color corresponding to a background image of the original image data is specified to be transparent. Next, the image data formed of the superimposed and combined layers is converted to data in an appropriate format.

Method 1 can be used not only for correcting a color of a background image but also for adding a frame ornament to the background image. Method 2 does not use the background image data 46. Processings of methods 2 and 3 can be applied separately or together. By applying both processings of methods 2 and 3, a frame ornament and so forth can be added to a background image as same as in the processing of method 1. In methods 2 and 3, a background image can be identified by using a standard deviation of mean color values of blocks of image data, Each RGB color value can be examined with standard deviations $\sigma_R$, $\sigma_G$, and $\sigma_B$ with respect to each color of RGB. An arithmetic mean or a geometric mean of each RGB color value can also be used to distinguish the background image from the subject image.

Alternatively, in methods 2 and 3, a background image and a subject image can be separated by filtering with a frequency acquired from a block representing the background image. When a filtering processing is allowed to take a long time or effects of dust or shading around a corner of an image are negligible, a background image and a subject image can be separated by filtering in units of pixels instead of in units of blocks.

A contrast correction unit 42 provides an appropriate contrast between the subject image and a new background image. The contrast correction unit 42 can automatically perform processing to relatively correct RGB values of the subject image and the new background image such that a contrast between the subject image and the new background image becomes an empirical ratio. In addition, the contrast correction unit 42 can interactively perform processing while displaying a correction result to a user each time it corrects the RGB values of the subject image and the new background image. When contrast correction is not required, the contrast correction unit 42 can be omitted.

An output result of the background image processing unit 40 or the contrast correction unit 42 is sent to a web server, or the like, through the storage device 20 or the network 30 after being stored in the buffer memory 44.

Figure 3:
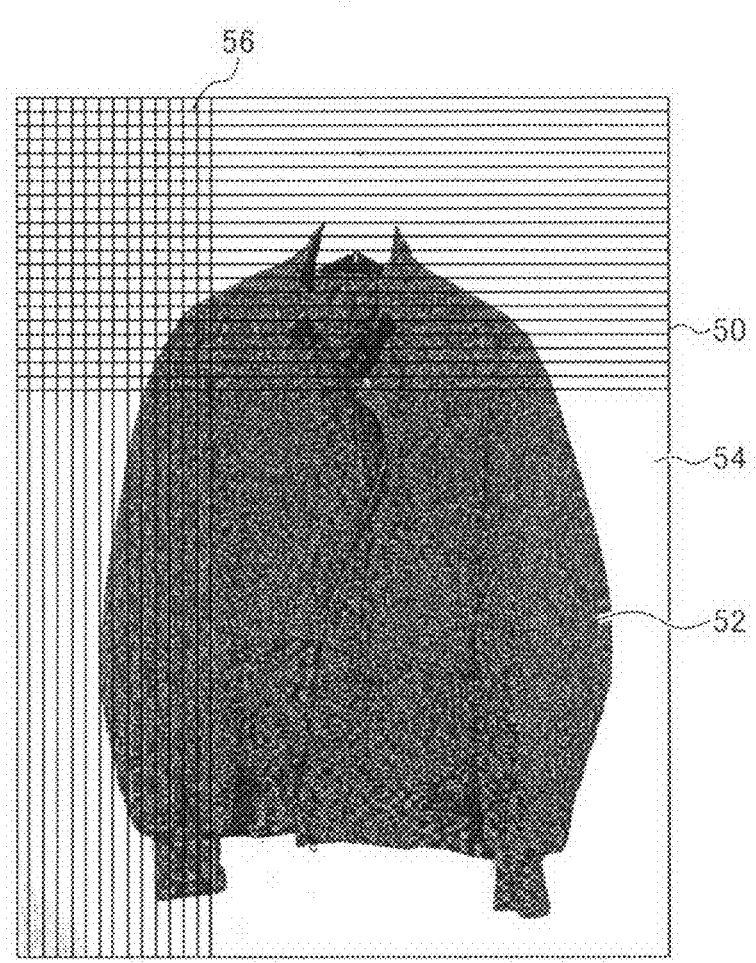
FIG. 3 is an example of image correction according to a preferred embodiment of the present invention.

FIG. 3 shows an example of processing for allocating image data to blocks to be performed by the image analysis unit 34 or the background image acquisition unit 36. Image data 50 shown in FIG. 3 includes a jacket 52 as a subject image. In the image data 50 of FIG. 3, the jacket 52 is surrounded by a background image 54. The image analysis unit 34 allocates pixels of the image data 50 to blocks 56 of a preset size, calculates a mean color value with respect to each of the blocks 56 by averaging RGB values of the pixels therein, and registers the mean color values with block identifiers to a memory such as a RAM.

Then, as described above, the background image acquisition unit 36 calculates a background color value from the n blocks around corners in four directions of the image data by averaging the mean color values of the n blocks, and a standard deviation of the mean color values of the n blocks. Next, when using the snake method, the subject image extraction unit 38 extracts the subject image by identifying blocks that have mean color values within one standard deviation of the background color value as the background image.

Figure 4:
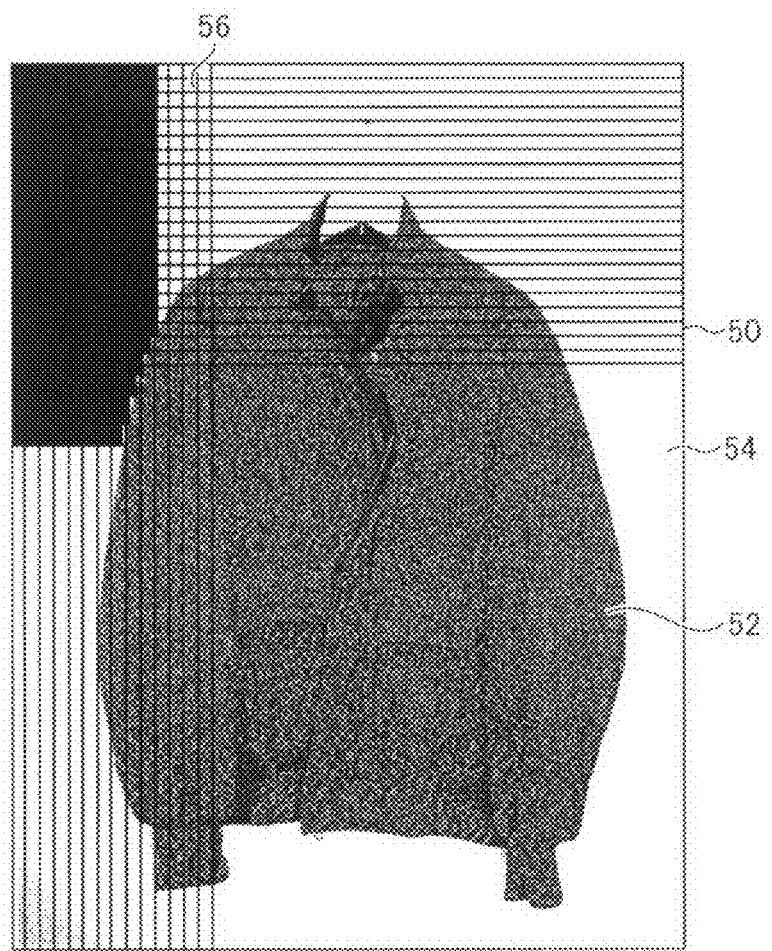
FIG. 4 is another example of image correction according to a preferred embodiment of the present invention.

FIG. 4 shows an example of processing to identify a subject image performed by the subject image extraction unit 38. As shown in FIG. 4, the subject image extraction unit 38 performs the processing to distinguish blocks from an upper left corner of image data of FIG. 4 to a downside, and the blocks identified as a background image are shown with hatch. In the present embodiment, the processing to distinguish a background image can be performed in any direction of image data shown in FIG. 4, however, performing the processing in one direction from a corner of image data to an inside is preferable from a view point of extracting a subject image. In addition, the processing can be simultaneously performed in four directions from four corners to an inside at once instead of being performed in each direction.

As shown in FIG. 4, some of the blocks of the background image around the subject image may remain due to a size of the blocks in comparison to the subject image. In such an example, a background image and a subject image can be separated more accurately by minimizing a size of the blocks gradually as they approach the subject image so to distinguish the background image from the subject image. In another embodiment, pixels having a color value equivalent to border areas between a subject image and a background image are selected from blocks including the subject image that are closest to the background image. Then, a pixel close to the subject image is left as a part of the subject image, and a pixel close to the background image is registered as a part of the background image. Thereby, the border areas between the subject image and the background image can be formed smoother.

Figure 5A:
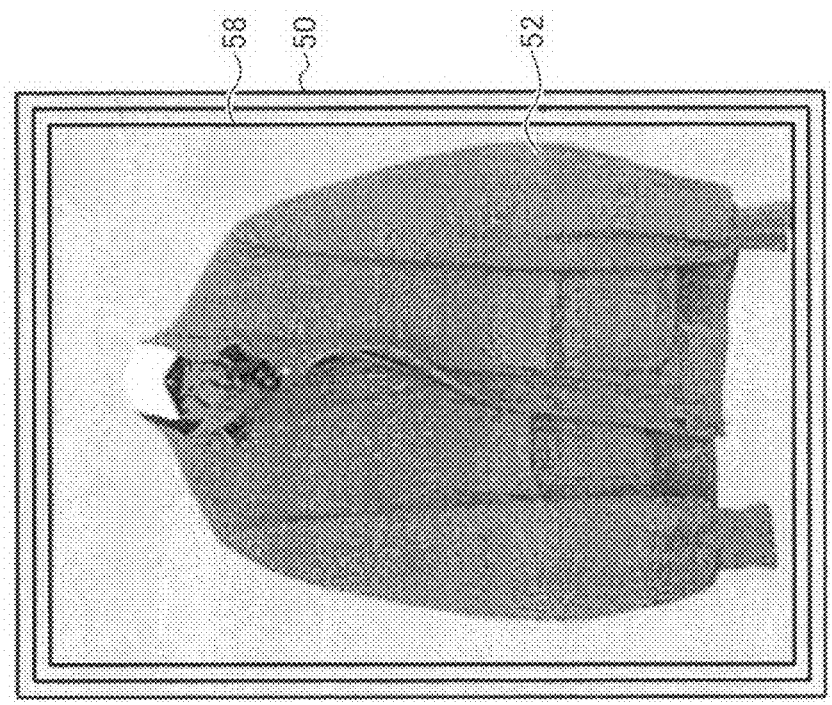
FIGS. 5A and 5B are examples of corrected image data according to a preferred embodiment of the present invention.
Figure 5B:
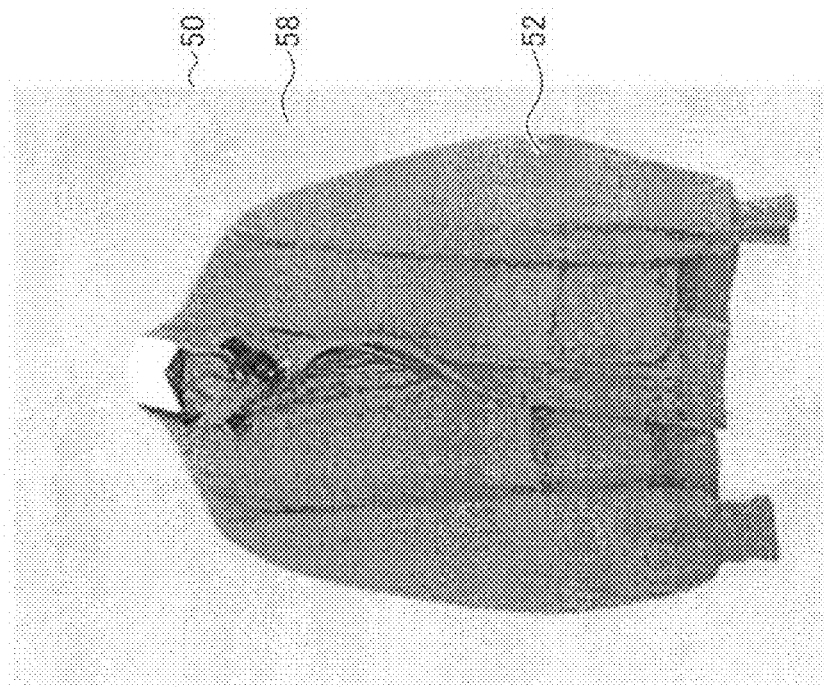

FIG. 5 shows corrected image data 58. The corrected image data 58 is prepared by correcting all color values of an area distinguished as a background image, which is separated from a subject image by the subject image extraction unit 38, by the background image processing unit 40 (with method 2). FIG. 5A shows an example of a uniform background image after correcting all the color values thereof. Correction of unevenness in the background image 54 results in the uniform background image of the corrected image data 58, FIG. 5B shows an example of a background image after correcting the background image and adding a window ornament thereto. As shown in FIG. 5B, the background image can be corrected so as to be more impressive by adding such an ornament. A window ornament or a frame ornament can be added to a background image by registering data of the ornament with the background image data 46 in advance or storing the data in another memory device and loading the data in response to a correction instruction by a user.

Figure 6A:
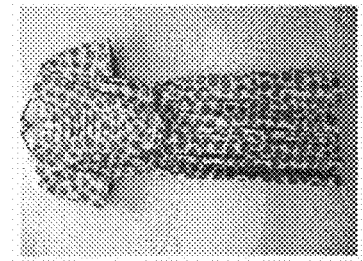
FIG. 6A, 6B, and 6C are examples of image data, a subject image, and corrected image data, respectively, according to a preferred embodiment of the present invention.
Figure 6B:
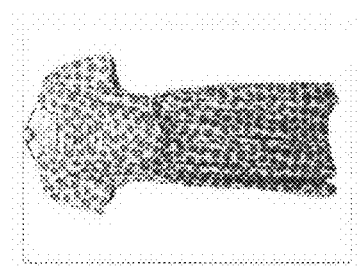
Figure 6C:
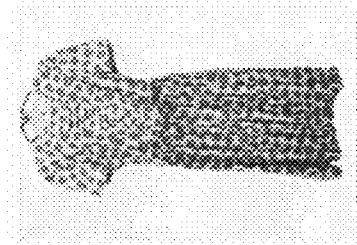

FIG. 6 shows another example of correction performed by the image correction processor 26. FIG. 6A shows image data before the correction. FIG. 6B shows subject image data after removing background image data from the image data. FIG. 6C shows corrected image data by superimposing and combining a lower layer of a background image and an upper layer of a subject image such that centers of gravity of both the background image and the subject image coincide after resizing the background image data to a size of the image data before the correction.

In the present specification, "center of gravity" means the center of gravity of an image area such that each area of a background image and a subject image has a uniform weight. The center of gravity of a background image coincides with a center thereof. By contrast, the center of gravity of a subject image varies with a shape of the object. When the centers of gravity of the background image and the subject image coincide, the object can be placed on the corrected image data in a balanced manner. Any method can be used for processing to superimpose a background image and a subject image, provided that the method can place an object on the background in a balanced manner.

As shown in FIG. 6C, the corrected image data has a lighter background than the image data before the correction shown in FIG. 6A. At the same time, a shadow of the object generated when the object is shot is eliminated, and the corrected image is entirely brighter than the image before the correction. As shown in FIGS. 5A, 5B and 6C, the image correction according to the present embodiment can improve a presentation of a subject image and display the subject image in a uniform format on a web page or the like.

Figures 7A, 7B:
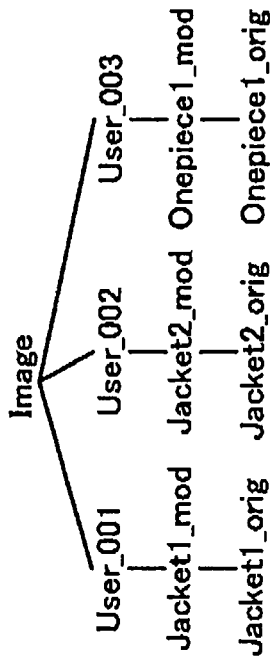
FIGS. 7A and 7B are examples of a data structure including image data, corrected image data, and a user identifier according to a preferred embodiment of the present invention.

FIG. 7 shows an example of a data structure in a database managed by the data processing apparatus 10 in a memory device such as a hard disk drive. FIG. 7A shows an example of the data structure in the database. FIG. 7B shows an example of a directory structure stored in the memory device such as a hard disk drive. As shown in FIG. 7A, image data (shown with the ".org" extension) and corrected image data (shown with the ".mod" extension) form a record assigned to each user identifier. The image data and the corrected image data can be associated with each other using any of the user identifier, the image data, and the corrected image data. The user identifier may be assigned by a service site, or it may be an e-mail address of the user, although it is limited to neither the assigned identifier nor the e-mail address.

As shown in FIG. 7B, the image data and the corrected image data are registered in a subordinate hierarchy of "/etc/image/User/." The data structure of FIG. 7 is a hierarchy structure of image data and corrected image data to identify the image data and the corrected image data in the data structure. In another example, image data and corrected image data can be stored in an identical directory by assigning different extensions thereto such that the image data and the corrected image data can be associated with each other.

In addition, XML can be used to form a data structure. Further, in order to retrieve image data using a DOM (Document Object Model), a user identifier assigned to a parent node and image data and corrected image data assigned to a child node can be registered as a tree structure corresponding to a correction record of the image data, and a user can select corrected image data to be registered from among a plurality of corrected image data with instructions by a user.

When the data processing apparatus 10 is configured as an application server, a web server, a data server, or the like, image data or corrected image data is specified as http://www.on-line_Ricoh.co.jp/index.html/Image/Image_001/Jacket1_mod, or the like, with a URL (Uniform Resource Locator) or a URI (Uniform Resource Identifier).

Figure 8:
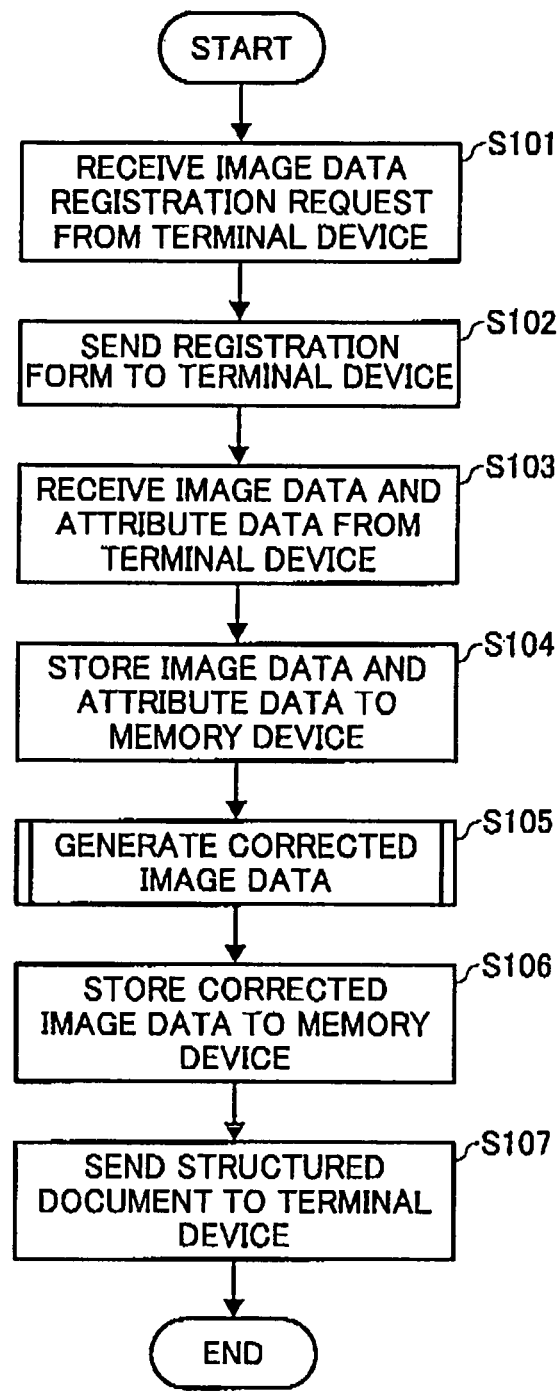
FIG. 8 is a flowchart of an example of processing performed by the data processing apparatus.

FIG. 8 shows a flowchart of a first example of processing performed by the data processing apparatus 10. In the processing, first, the data processing apparatus 10 receives an image data registration request from a terminal device (step S101). Then, the data processing apparatus 10 sends a registration form (refer to FIG. 11) to the terminal device (step S102). Next, the data processing apparatus 10 receives image data through the registration form from the terminal device by e-mail using an SMTP protocol or by uploading the image data using an HTTP protocol (step S103).

In step S103, when being sent by e-mail, the image data is attached to an e-mail. In the first example shown in FIG. 8, a variety of formats that have been known so far, such as GIF, PNG, TIFF, JPEG, JPEG2000, BMP (Bit MaP), EXIF (Exchangeable Image File Format), and so forth, can be used for the image data. Attribute data for uploading the image data such as a type and a condition of an object, a suggested list price, and so forth, is described in text of the e-mail sent to the data processing apparatus 10. When receiving the e-mail in step S103, the data processing apparatus 10 starts a text parser and extracts the attribute data such as a type and a condition of an object, a suggested list price, and so forth, from the received e-mail. Then, the data processing apparatus 10 stores the attribute data in relation to a user identifier (step S104). When the terminal device mounts software corresponding to an image format such as an EXIF, attribute data can be described in an area specified by a special tag of image data as metadata and is not required to be described in the text of e-mail.

When image data in an EXIF format is uploaded using an HTTP protocol, the image data and attribute data thereof is sent to the data processing apparatus 10 by clicking a "send" button on the registration form after describing the attribute data in the above-described area for describing attribute data and registering the image data to be uploaded.

Then, after storing the image data and the attribute data, the data processing apparatus 10 generates corrected image data automatically or with an instruction by a user (step S105). In step S106, the data processing apparatus 10 stores the corrected image data in relation to the image data. Next, the data processing apparatus 10 sends a structured document in which an URI of the corrected image data is described to the terminal device in response to a browsing request from the terminal device and displays a web page of the corrected image data on the terminal device via browser software (step S107).

In the processing shown in FIG. 8, the data processing apparatus 10 automatically performs the correction by selecting a correction condition to satisfy a criterion from a list of correction conditions managed by the data processing apparatus 10 without an instruction by a user to perform correction on the image data. When the terminal device does not have a browsing function, the data processing apparatus 10 sends a form (refer to FIG. 13) to the terminal device by e-mail, and the terminal device downloads the corrected image data by e-mail using the form, In addition, when the data processing apparatus 10 sends the corrected image data to the terminal device by e-mail, the terminal device can acquire the corrected image data without access to a specific URL.

FIG. 9 shows a flowchart of a second example of processing performed by the data processing apparatus 10. In the second example, the data processing apparatus 10 generates corrected image data in response to an instruction to execute correction or to specify a correction condition by a user. First, the data processing apparatus 10 continuously monitors whether or not the data processing apparatus 10 receives a correction request from a user (step S201). When a user issues a correction request through a terminal device (step S201: Yes), the data processing apparatus 10 acquires a user identifier of the user from the correction request and retrieves image data to which corrected image data is not registered from image data registered by the user (step S202). Then, the data processing apparatus 10 sends a URI of the retrieved image data described in an HTML file to the terminal device and allows a user to browse the image data on the terminal device (step S203).

Next, the data processing apparatus 10 acquires an instruction to execute the correction and a correction condition included in the instruction or sent to the data processing apparatus 10 apart from the instruction (step S204). In step S205, the data processing apparatus 10 starts the image correction processor 26 and generates corrected image data by performing the correction on the image data according to the correction condition. Afterwards, the data processing apparatus 10 stores the corrected image data to the storage device 20 to display the corrected image data on a web page (step S206) and terminates the processing.

FIG. 10 shows a flowchart of an example of correction processing performed by the data processing apparatus 10. First, the data processing apparatus 10 (more-precisely, the image correction processor 26) acquires image data (step S301) and allocates pixels of the image data to blocks (step S302). Then, the data processing apparatus 10 calculates a mean color value with respect to each block and a background color value of a background image and stores the background color value in the buffer memory 44 (step S303). Next, the data processing apparatus 10 extracts a subject image from the background image by identifying blocks that have mean color values within one standard deviation of the background color value as the background image (step S304). Afterwards, the data processing apparatus 10 performs a background image processing on the extracted subject image and the background image to generate corrected image data, stores the corrected image data in relation to the image data, and terminates the correction processing (step S305). The data processing apparatus 10 performs the background image processing using the methods described in FIGS. 5 and 6.

In the correction processing shown in FIG. 10, the data processing apparatus 10 can separate the background image and the subject image by filtering with a spatial frequency. When distinguishing the background image by filtering after applying a Fourier transformation to the image data, the data processing apparatus 10 obtains a spatial frequency spectrum with respect to each block in step S303 and extracts the subject image from the background image by filtering in step S304.

Figure 11A:
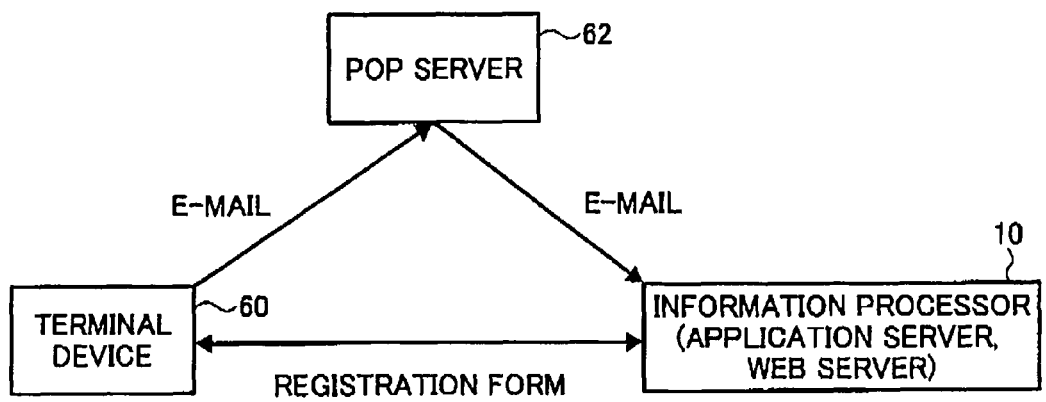
FIGS. 11A and 11B are examples of transmitting image data from a terminal device to the data processing apparatus.
Figure 11B:
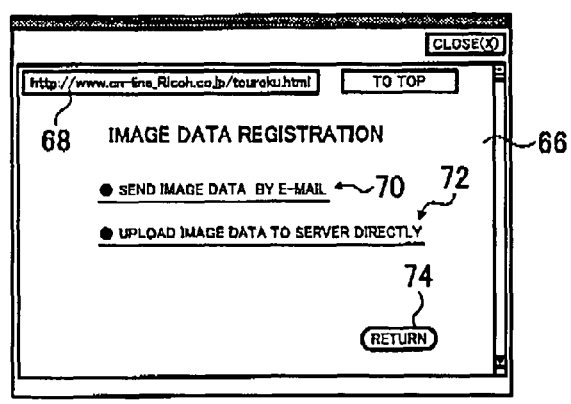

FIG. 11 shows an example of transmitting image data from a terminal device to the data processing apparatus 10. FIG. 11A shows an example of a transaction between a terminal device 60 and the data processing apparatus 10. FIG. 11B shows an example of a registration form sent to the terminal device 60 from the data processing apparatus 10. The terminal device 60 shown in FIG. 7A may be a cellular phone, a digital camera, a PDA, a personal computer, or the like. When equipped with a browsing function, the terminal device 60 accesses the data processing apparatus 10, which is an application server, a web server, or the like, by using the registration form or a CGI. Alternatively, the terminal device 60 can also access the data processing apparatus 10 by e-mail using an SMTP protocol via a POP server 62.

A user can register image data using a registration form 66 shown in FIG. 11B. In the registration form 66, the user can select a method to transmit image data to the data processing apparatus 10 from hyperlinks 70 and 72, "SEND IMAGE DATA BY E-MAIL" and "UPLOAD IMAGE DATA TO SERVER DIRECTLY," respectively, considering an environment of the terminal device 60 or an entry task. In addition, in the registration form 66 a button 74 for the user to interrupt registration and return to the top of the page and so forth are included.

When accessing the data processing apparatus 10 using the registration form 66, the terminal device 60 can transmit image data to a dedicated e-mail address by a tag or action such as <ahref=mailto:On-line_Ricoh@co.jp>. When the terminal device 60 supports an EXIF, a user can efficiently send an e-mail to transmit image data from the terminal device 60 by describing attribute data in a position specified by a tag of the image data instead of describing the attribute data in the text of the e-mail. Further, since a parameter of a digital camera for shooting (exposure, focal length, with or without flash, white balance) and so forth can be described as metadata of an EXIF file, the data processing apparatus 10 can efficiently correct the image data.

When uploading image data from the terminal device 60 to the data processing apparatus 10 using the registration form 66, a user can describe a URL to perform a CGI processing such as registration or correction of the image data in the registration form 66, for example, <ahref="http://www.on-line/Ricoh.co.jp/cgi-bin/touroku.cgi"method="post"enctype=" ">. The user can access a URL to register image data directly and upload the image data with attribute data thereof by filling in the registration form 66 displayed on a monitor of the terminal device 60.

Figure 12:
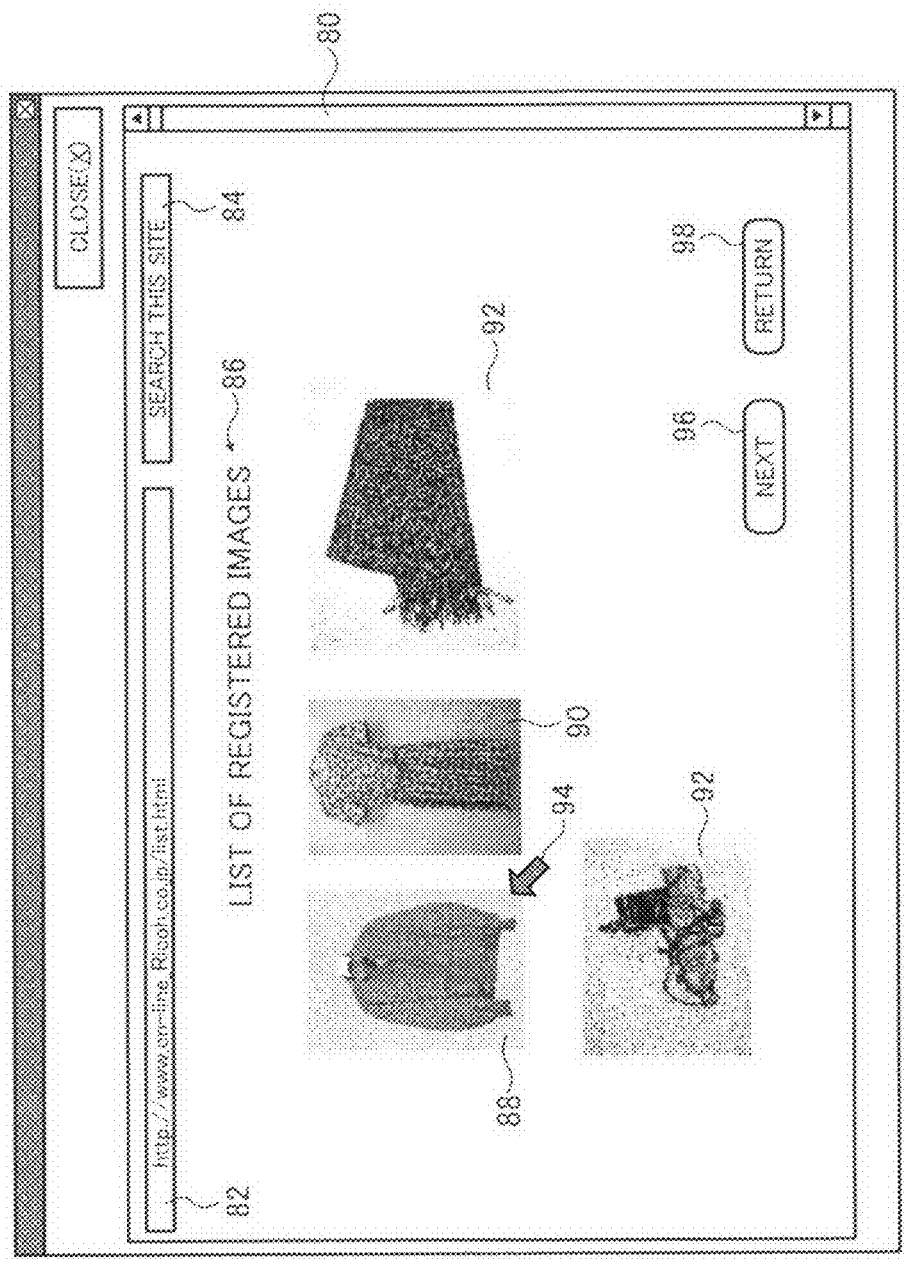
FIG. 12 is an example of a web page for showing corrected image data registered by a user.

FIG. 12 shows an example of a web page 80 for showing corrected image data registered by a user. The web page 80 shows corrected image data to the user by using browsing software of the terminal device 60. For example, when the user accesses "http://www.on-line_Ricoh.co.jp/list.html," the web page 80 is displayed. In the web page 80, a field 82 to show a URL of the web page 88, a field 84 to input a keyword for search inside a site, an indication 86 such as "LIST OF REGISTERED IMAGES" are included.

Further, a plurality of corrected image data such as corrected image data 88 and 90 registered in the data processing apparatus 10 are displayed in the web page 80. In addition, image data 92 is displayed as image data transmitted from the terminal device 60 without correction since a user has selected to display the image data 92 without correction. The corrected image data 88 and 90 is displayed as icons to which hyperlinks to URIs of image data before correction are provided. When putting a cursor 94 on and double-clicking the corrected image data 88 and 90 on the web page 80, the user can refer to the corresponding uncorrected image data.

Furthermore, a button 96 to go to a next page to browse another image and a button 98 to return to a previous page are provided, thus enabling the user to freely browse image data registered in the data processing apparatus 10.

Figure 13:
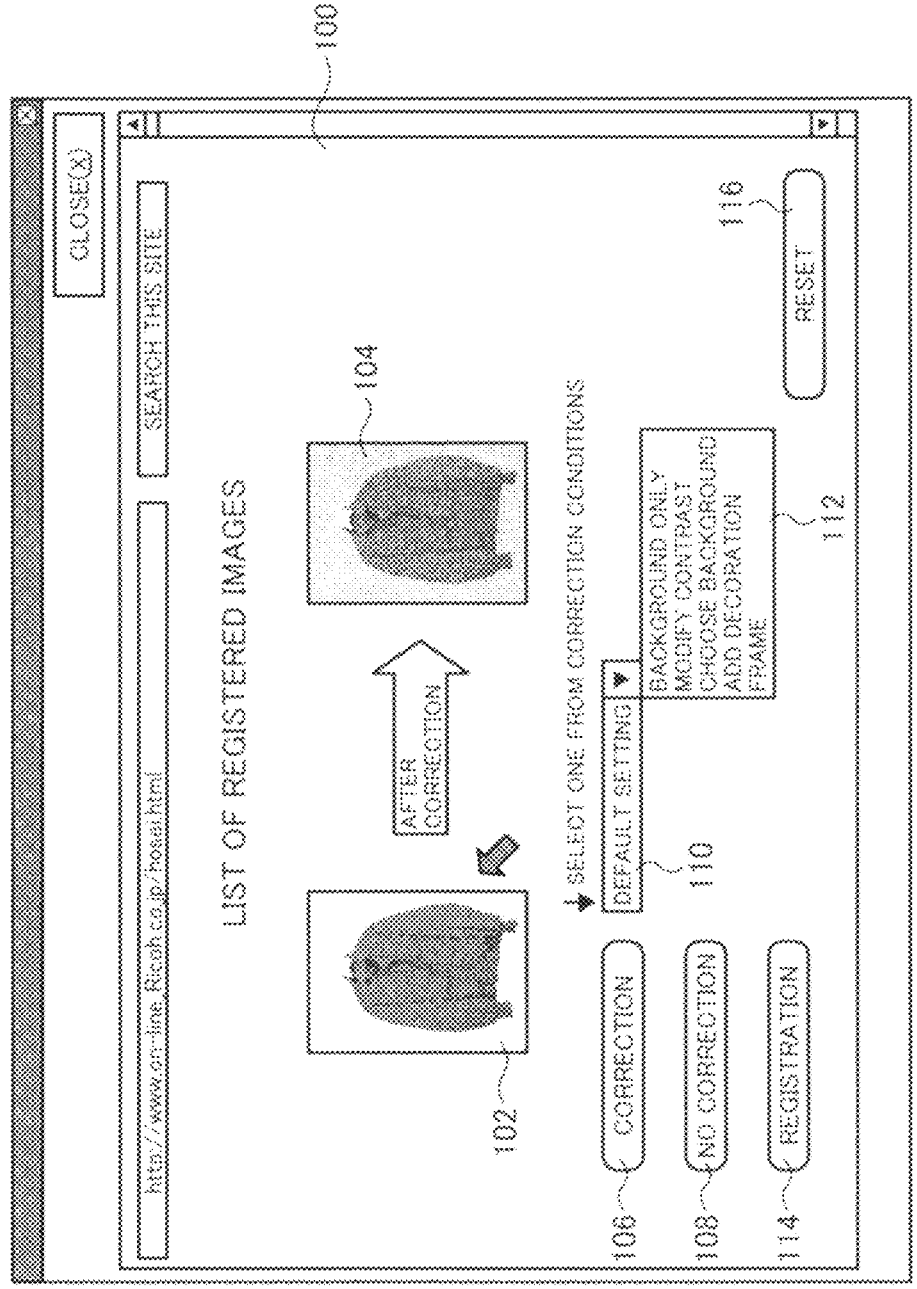
FIG. 13 shows an example of a web page to be displayed when a user issues an instruction to correct registered image data after the image data is registered to the data processing apparatus from a terminal device.

FIG. 13 shows an example of a web page 100 to be displayed when a user issues an instruction to correct registered image data after the image data is registered to the data processing apparatus 10 from the terminal device 60. After image data is transmitted from the terminal device 60 and registered to the data processing apparatus 10 with a request by the user, the web page 100 is displayed when the user accesses a specific web page from a terminal device having a browsing function such as a personal computer or a cellular phone. For example, in order to access the web page 100 shown in FIG. 13, the user enters a URL such as "http://www.on-line_Ricoh.co.jp/hosei.html" to browsing software.

After the user enters the URL, a window that requires the user to enter a user identifier, a password, and so forth to access the data processing apparatus 10 is displayed on a monitor of the terminal device. When the user enters a user identifiers a password, and so forth in an entry field and the data processing apparatus 10 verifies the user identifier, the password, and so forth, the web page 100 shown in FIG. 13 is displayed on the monitor. The user identifier can be identical to the user identifier attached by a user to register image data or it can be an identifier related to an e-mail address which the data processing apparatus 10 can retrieve by referring to another database for managing user information.

The data processing apparatus 10 uses the entered user identifier as a search key and retrieves image data related to the user identifier from a database. Then, the data processing apparatus 10 acquires image data for which corresponding corrected image data is not generated as image data requested to be corrected from the retrieved image data and describes a file name of the image data in a predetermined position of a structured document in a URI format in a linkable manner.

The data processing apparatus 10 can determine whether or not corrected image data corresponding to the image data before correction is generated and registered by examining an identical file name as the image data before correction having an extension to be provided to corrected image data or an access log to the image data before correction. Alternatively, the data processing apparatus 10 can also retrieve the image data requested to be corrected from a database using a SQL or the like. By using a JAVA (registered trademark) servlet, the data processing apparatus 10 displays the retrieval result by describing a URI in a structured document to display retrieved image data or corrected image data, or by registering the retrieved image data to a URI referred by a structured document.

On the web page 100, image data 102 before correction is shown. When the user recognizes the image data 102 on the web page 100 and desires to perform correction thereon, the user displays a pull-down menu 112 to select a correction condition from an entry field 110 to specify a correction condition. After selecting a desired correction condition, the user clicks a button 106 to execute the correction and sends a correction instruction including the correction condition to the data processing apparatus 10.

When receiving the correction instruction including the correction condition, the data processing apparatus 10 calls an image processing script and causes the image processing script to perform the processing shown in FIGS. 9 and 10. Then, the data processing apparatus 10 receives corrected image data 104 as the result of the image processing script performed and stores the corrected image data 104 in an identical directory as that of the image data 102 or in a field of a record identified by the single user identifier in the storage device 20. Subsequently, the data processing apparatus 10 starts a servlet and provides a hyperlink to the corrected image data 104 in the structured document supporting the web page 100 to display the corrected image data 104 in a predetermined position of the web page 100.

On the other hand, when not desiring to correct the image data, the user can register the image data without correction by clicking a button 108 to register image data as is. In addition, after verifying the corrected image data 104, the user can iterate the above-described processing to correct image data until satisfied with the correction result. When the correction processing is completed, the user registers the corrected image data by clicking a button 114 to register the corrected image data.

Figure 14:
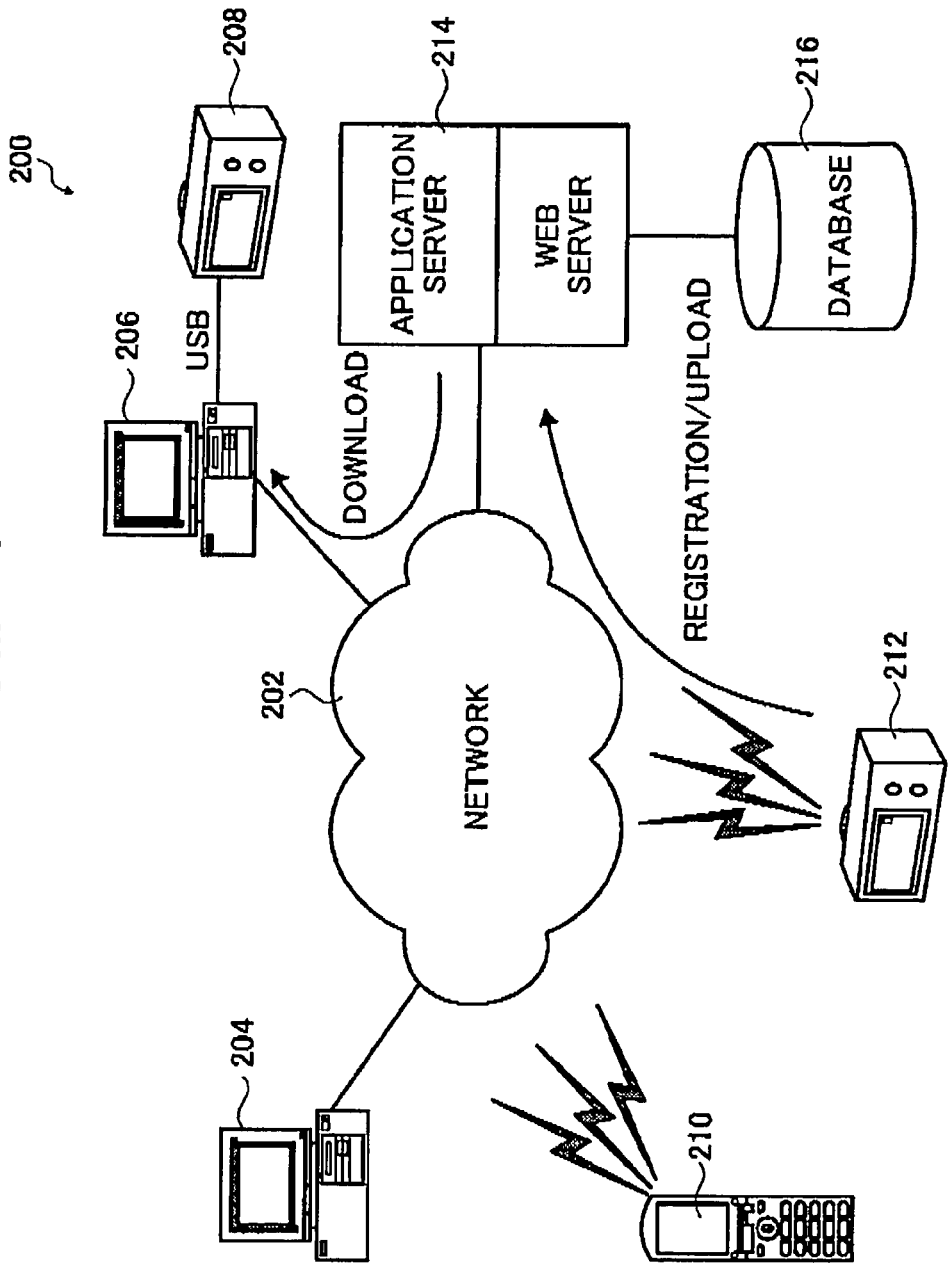
FIG. 14 is an example of a network system including a data processing apparatus.

FIG. 14 shows an example of a network system including a data processing apparatus. A plurality of terminal devices is mutually connected to a network system 200 shown in FIG. 14 through a public network 202 such as the Internet. In the network system 200, a variety of transactions such as registration of image data, browsing and downloading image data and corrected image data, and so forth, can be performed. As for the terminal devices, personal computers 204 and 206, a cellular phone 210, a digital camera 212, and so forth are shown in the example of FIG. 14. However, it should be noted that the present invention is not limited to the above-described terminal devices.

A server 214 including functions of an application server and a web server, which is used as the data processing apparatus 10, is connected to the public network 202. The application server performs processing such as registration or correction of image data, and the web server displays image data and corrected image data on a monitor of the terminal device and provides an interface for calling an image processing script. The server 214 controls a hard disk drive and so forth and stores image data and corrected image data in a database 216.

The personal computer 206 receives image data from a digital camera 208 via a bus such as a USB (Universal Serial Bus) and requests the server 214 to register or correct the image data. The personal computer 206 includes utility software to process image data in an EXIF format which the digital camera 208 supports, and transmits image data in the EXIF format as it is to the server 214. The utility software can automatically or manually apply pre-processing to image data to be transmitted to the server 214 before the transmission. The utility software can include application software for performing image processing as pre-processing such as white balance adjustment, color saturation correction, sharpness adjustment, contrast adjustment, distortion correction, image size adjustment, noise elimination, and so forth. For example, the application software may have a function such as Photoshop (registered trademark).

The cellular phone 210 acquires image data by using a mobile camera mounted in the cellular phone 210 and stores the image data in a storage medium such as an SD card or the like. Then, the cellular phone 210 accesses the server 214 by sending an HTTP request (an image registration request) in which a URL for image registration is specified through a base station and a gateway server of a carrier managing the cellular phone 210 and the public network 202. The server 214 sends the registration form 66 shown in FIG. 11B to the cellular phone 210, and the registration form 66 is displayed on a monitor of the cellular phone 210. A user selects a method to transmit image data to the server 214 according to the registration form 66 and registers image data to the server 214. Subsequently, the user can correct the registered image data.

In general, the monitor of the cellular phone 210 is smaller than a monitor of the personal computer 204. When desiring to correct image data using the personal computer 204, the user can access the web page 100 from the personal computer 204 to display thereof after registering the image data. The server 214 can determine whether or not the user identifier and the registered image data correspond by searching the database 216 as described with reference to FIG. 13. In another example, after receiving an image data registration request from a terminal device supporting an HTTP protocol, the server 214 can return the web page 100 to the terminal device as an HTTP response to enable the user to correct image data easily.

On the other hand, when receiving image data to be registered by e-mail, the server 214 can register a sender of the e-mail as a user identifier with the received image data. When the user accesses the server 214 from the personal computer 204, the server 214 obtains the sender of an e-mail as the user identifier and retrieves image data corresponding to the user identifier to correct the image data.

The server 214 stores corrected image data of which correction is completed by the user from the web page 100 in the database 216. The server 214 completes registration of the corrected image data by entering a file name thereof in a field corresponding to the image data before the correction, such as a relational database.

The server 214 also includes a function of a web server. The server 214 displays not only a window of corrected image data but also a window of an image data providing service, an image data repository service, an Internet shopping service, a weblog, an SNS (social networking service), a printing service, a facsimile service, or the like, according to a purpose of a request from the general public including a user who has registered image data and a plurality of users other than the user. The user can select desired corrected image data on a web page displayed on a monitor of a terminal device and refer to image data before correction retrieved by the corrected image data. The user can also compare other image data while referring to the image data before correction and the corrected image data, and receive a variety of services from a service site providing a web page such as an Internet shopping service, an Internet auction service, or the like.

Figure 15:
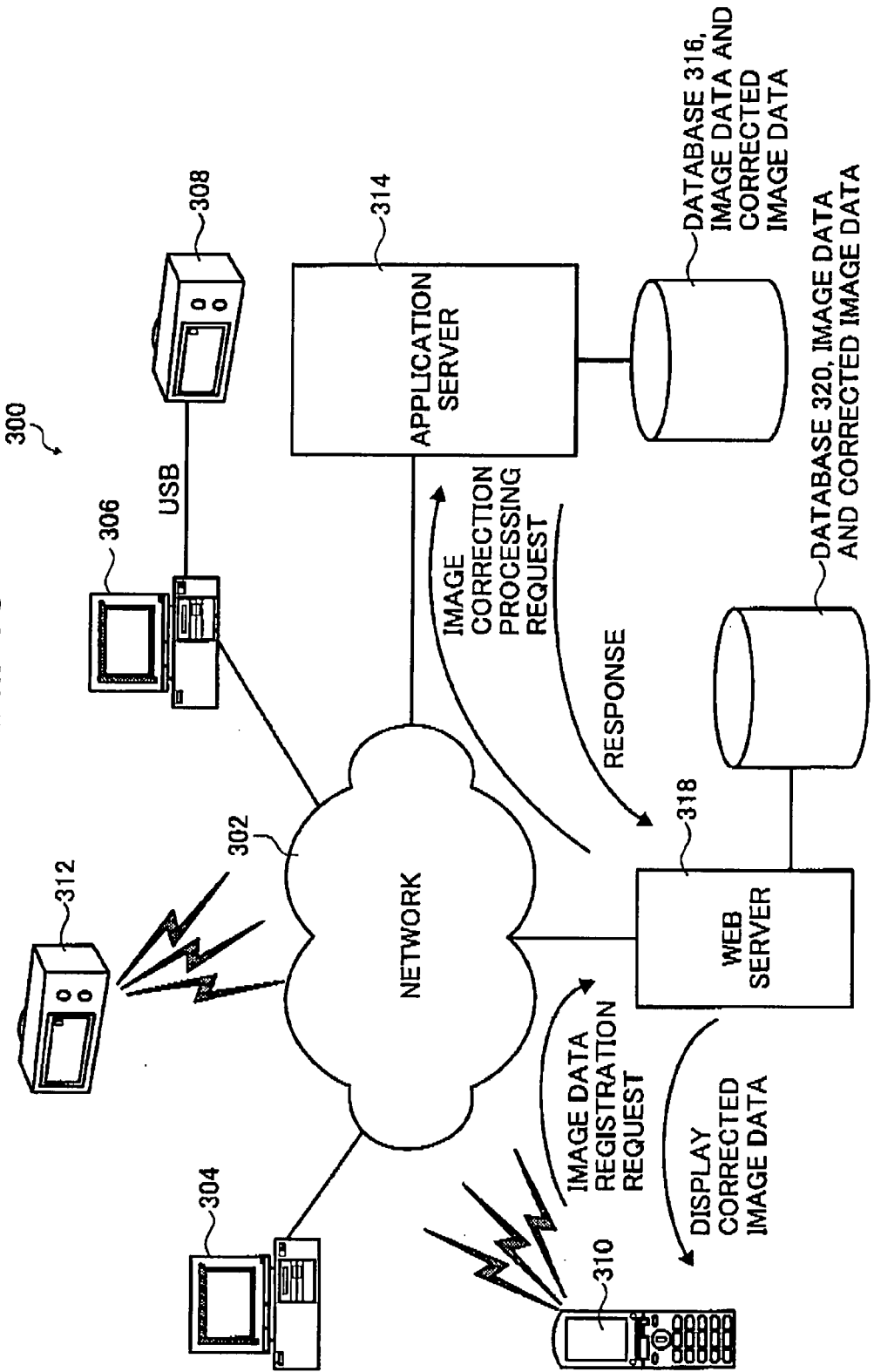
FIG. 15 is another example of a network system including a data processing apparatus.

FIG. 15 shows another example of a network system. In a network system 300 shown in FIG. 15, a data processing apparatus is separated into a server 314 and a server 318. The server 314 serves as an application server and performs image data correction of image data transmitted from a terminal device such as a cellular phone 310, a digital camera 312, personal computers 304 and 306, or the like, in response to a request from the server 318. The server 314 also manages a database 316 and stores both image data and corrected image data therein. In other words, the server 314 also functions as a database server or a backup server for image data.

On the other hand, the server 318 receives an image data registration request from a user and registers image data in a database 320. When receiving a correction instruction to registered image data from the user, the server 318 transmits the image data, a correction condition, and a network address of the server 318, which can be an IP (Internet Protocol) address or a URL, to the server 314. Further, in the present embodiment, the server 318 sends an image processing script identifier to the server 314 to cause the server 314 to call an image processing script and generate corrected image data.

When generating corrected image data, the server 314 transmits the corrected image data to the server 318 as a response packet. When receiving the corrected image data from the server 314, the server 318 stores the corrected image data in a storage area to show the corrected image data on a terminal device, attaches a specific URI to identify the corrected data thereto, and displays the corrected image data to a user through a web page. The server 318 can store the image data before the correction or manage only a URL attached to the image data before the correction when transmitting the image data to the server 314 by deleting the image data after transmitting the image data to the server 314.

In addition, the server 318 also serves as a web server providing an image data providing service, an image data repository service, an Internet shopping service, an Internet auction service, a weblog, an SNS (social networking service), a printing service, a facsimile service, or the like. The server 318 provides a variety of services using browsing software through a public network 302 in response to access to web pages by the general public.

Figure 16:
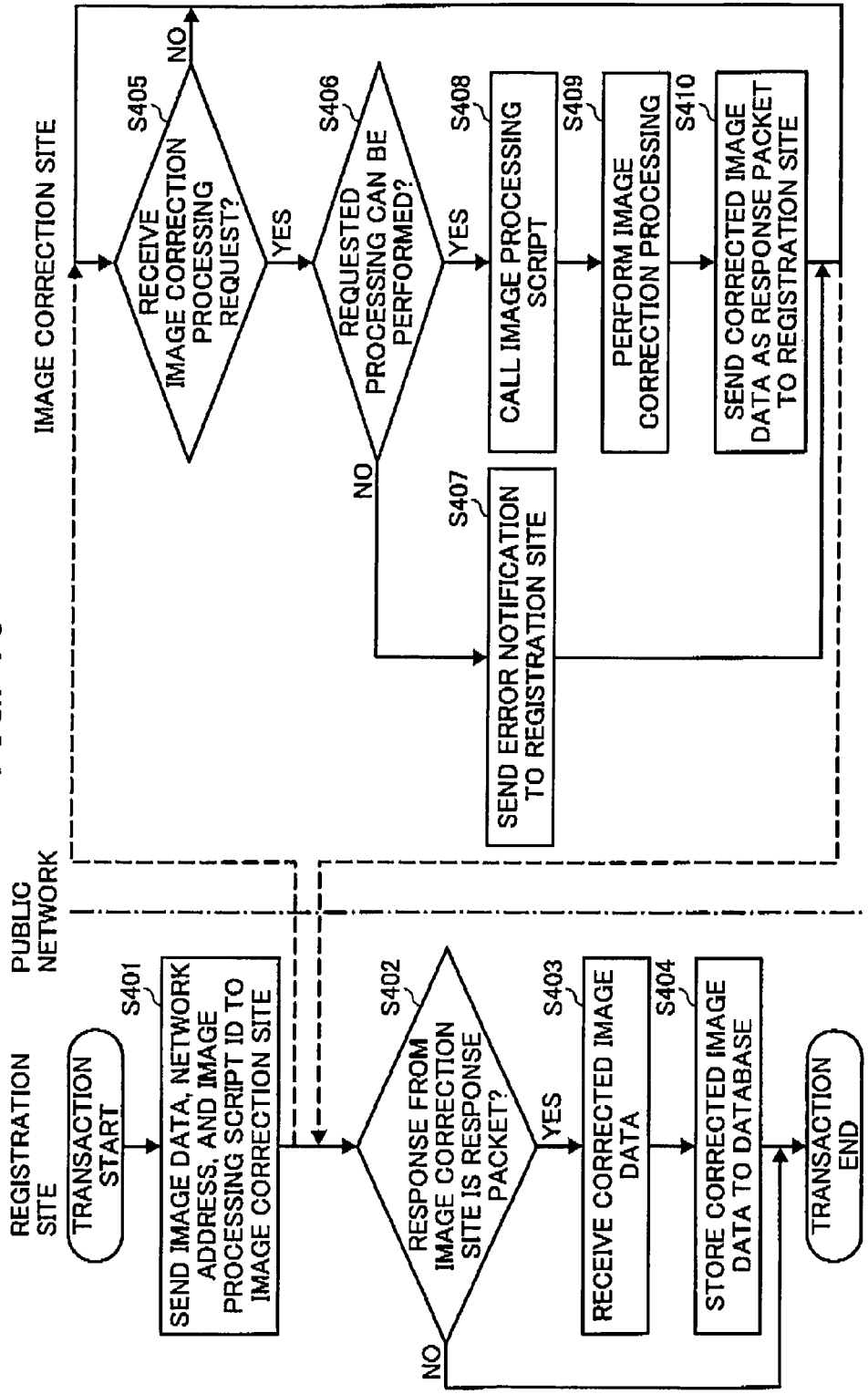
FIG. 16 is a flowchart of a transaction example to correct image data performed in the network system shown in FIG. 15.

FIG. 16 shows a flowchart of an example of correction to be performed in the network system 300 shown in FIG. 15. More specifically, the flowchart of FIG. 16 shows an example of a transaction between the server 314 and the server 31B to perform image data correction. When a user sends a correction instruction to the server 318 (hereinafter, referred to as a registration site), the transaction starts, First, the registration site sends an image correction request including image data, a network address of the registration site, and an image processing script identifier to the server 314 (hereinafter, referred to as an image correction site) (step S401).

Then, the registration site waits for a response from the image correction site (step S402). When the response is a response packet (step S402; Yes), the registration site receives corrected image data included in the response packet (step S403). When the response from the image correction site is not a response packet but an error notification (step S402: No), the registration site terminates the transaction.

After receiving the corrected image data, the registration site stores the corrected image data in an appropriate storage area (step S404) and terminates the transaction.

On the other hand, the image correction site is on standby as a daemon, waiting to receive an image correction request from the registration site (step S405). When not receiving the image correction request (step S405: No), the image correction site still waits to receive the image correction request in step S405. When receiving the image correction request (step S405: Yes), the image correction site looks up a script table (shown in FIG. 17) in which an image processing script identifier is entered and determines whether or not the image correction site can perform the requested image correction by examining an image processing script identifier corresponding to the network address of the registration site included in the image correction request (refer to FIG. 17) (step S406).

When determining that the image correction site cannot perform the requested image correction (step S406: No), the image correction site sends an error notification to the registration site to cause the registration site to terminate the transaction and returns to step S405. When determining that the image correction site can perform the requested image correction (step S406: Yes), the image correction site calls an image processing script by using a POST (Power On Self Test) method of HTTP methods (step S408).

Then, the image correction site executes the called image processing script to correct the image data by defining the image data as an instance of the image processing script (step S409). The image correction site includes a plurality of different image processing scripts corresponding to a correction condition set or specified to the registration site serving as a service site or to a method to distinguish a background image from a subject image. Therefore, even if the network system 300 includes a plurality of registration sites, the image correction site can provide a specific correction condition to each of the registration sites. Afterwards, the image correction site transmits a response packet including the corrected image data to the registration site (step S410) and terminates a thread of the image processing script. Then, the image correction site returns to step S405.

Figure 17:
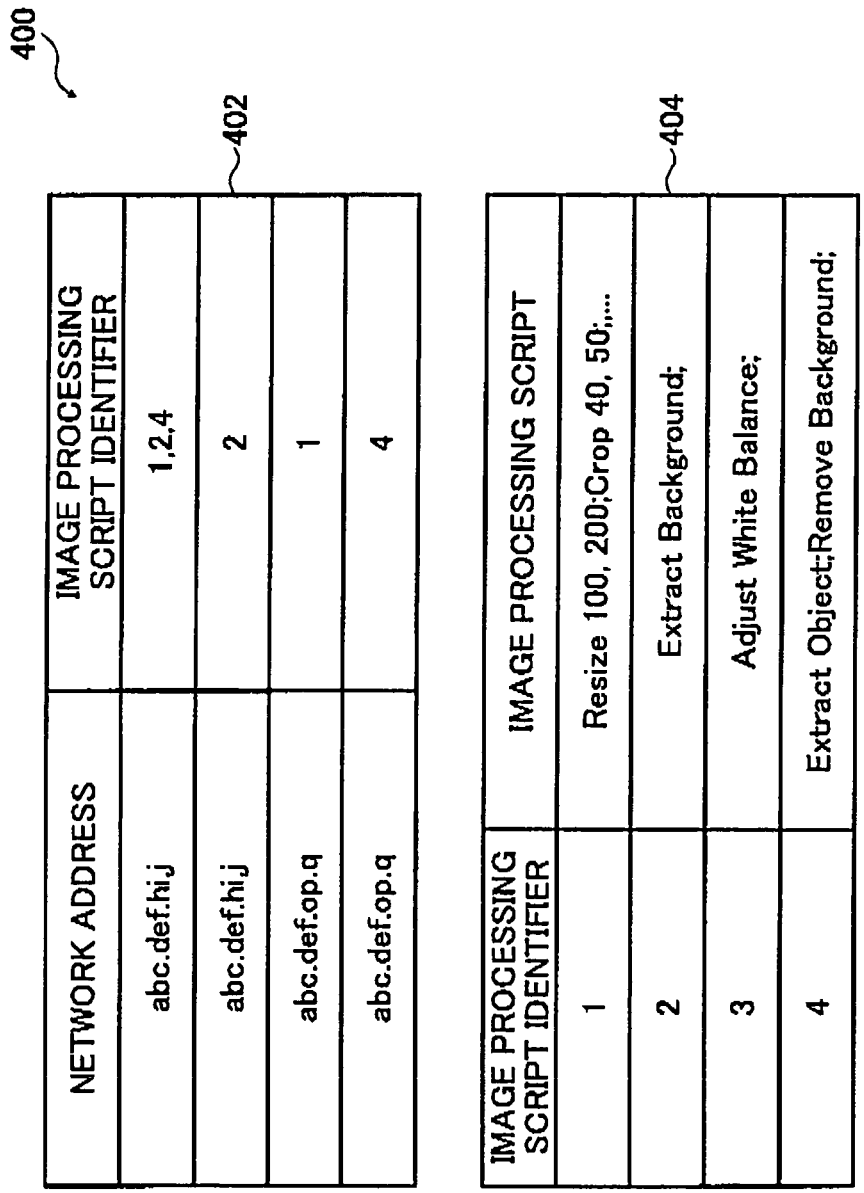
FIG. 17 is an example of a script table to select an image processing script included in an image correction site.

FIG. 17 shows an example of a script table. The image correction site includes a script table and determines whether or not the image correction site can perform the requested image correction from the registration site by using the script table in step S406 of FIG. 16. A script table 400 shown in FIG. 17 includes a table 402 to relate a network address of the registration site to an image processing script identifier and a table 404 to relate an image processing script identifier to an image processing script.

When receiving an image correction request from the registration site, the image correction site determines whether or not the requested image correction is permitted to the registration site by looking up the table 402 with a network address of the registration site and an image processing script identifier included in the image correction request. When the requested image correction is not permitted to the registration site, for example, when an image processing script identifier not assigned to the network address of the registration site is sent to the image correction site, the image correction site returns an error notification to the registration site (step S407 of FIG. 16).

When the registration site sends an image processing script identifier permitted to the network address thereof, the image correction site looks up the table 404 and finds an image processing script corresponding to the image processing script identifier. Then, the image correction site calls and executes the image processing script to correct the image data (steps S408 and S409). For example, an image processing script specified by an image processing script identifier of 1 resizes image data. An image processing script specified by an image processing script identifier of 2 extracts a background image. An image processing script specified by an image processing script identifier of 3 adjusts a contrast (a white- and black balance). An image processing script specified by an image processing script identifier of 4 extracts a subject image and deletes the background image. An image processing script identifier can be individually related to an image processing script corresponding to a different correction condition or to a different object. According to a specific purpose, the image correction site can include a script table in which an image processing script identifier is appropriately related to an image processing script.

The image correction site can includes a script table having a type of data structures other than the data structure of the script table 400 shown in FIG. 17, as long as the image correction site can specify a network address and an object or a script to be applied on image data to correct image data.

As shown in FIG. 17, a plurality of image processing script identifiers, in other words, a plurality of types of image correction, can be assigned to one network address when the registration site displays the web page 100 on a monitor of a terminal device to allow a user to select a correction condition, as described in FIG. 13.

When a registration site is separated from an image correction site such as the network system 300 shown in FIG. 15, the registration site retrieves an image processing script identifier corresponding to a correction condition selected by a user on a web page such as the web page 100 shown in FIG. 13 and stores the image processing script identifier and the image data in a send data buffer. Then, the registration site describes the image processing script identifier and the image data in a payload of data to be sent to the image correction site, and enters a network address of the registration site and an IP address of the image correction site in a field of an IP address of a sender and a field of an IP address of a receiver of a header of the data, respectively, to send the data to the image correction site. When an address other than an IP address is used for a network address of the registration site, a URL or a URI of the registration site can be described in the payload such that the image correction site can perform image data correction. When a URL or a URI of the registration site is described in the payload, the URL or URI can be entered in the table 402 instead of a network address.

Alternatively, between the registration site and the image correction site, the image correction site can start a script as a servlet or a server program such as Apache and perform processing equivalent to an image processing script through a grid computing architecture such as RPC (Remote Procedure Call), CORBA (Common Gateway Object Resource Broker Architecture), SOAP (Simple Object Access Protocol), or the like, in which an image processing script identifier of an image processing script to be called to correct image data, image data, and a network address of the registration site are specified.

As described above, according to the present invention, since the general public can browse corrected image data having a certain standard in comparison with image data registered by a user and quality of image data shown on a web page can also be stable, availability of the web page increases and a user accesses the web page more frequently. In addition, according to the present invention, since a user can interactively correct image data and a correction condition is limited to a condition that does not modify image data greatly, the relation between image data and corrected image data can be clarified. Therefore, a network service having high availability, credibility, and reliability can be provided in an Internet shopping service, an Internet auction service, an SNS, or the like.

The above-described functions according to the present invention can be performed by a program, which can be installed in a device, described in a legacy programming language, an object oriented language, or the like, such as C, C++, Java (registered trademark), Java (registered trademark) Beans, Java (registered trademark) Applet, Java (registered trademark) Script, a servlet, Apache, Pearl, Rubby, or the like, and the program can be distributed by being stored on a device-readable recording media.

It should be noted that the above-described embodiment and examples are merely illustrative, and numerous additional modifications and variations are possible in light of the above teachings. For example, elements and/or features of different illustrative and preferred embodiments herein may be combined with each other and/or substituted for each other within the scope of this disclosure. It is therefore to be understood that the disclosure of this patent specification may be practiced otherwise than as specifically described herein.

What is claimed is:

1. A data processing apparatus configured to register image data, comprising:
   a registration data storage unit configured to receive and store at least one network address in association with at least one image processing script identifier;
   a network processor configured to receive a correction request through a network, the correction request comprising image data, a first network address, and a first image processing script identifier;
   an image correction processor configured to analyze the image data, extract a background image and a subject image from the image data, and correct the extracted background image according to an image processing script corresponding to the received first image processing script identifier; and
   a storage device configured to store the corrected background image such that the image data is associated with the corrected background image;
   wherein the image correction processor is further configured to determine whether image correction can be performed by accessing the first image processing script identifier associated with the first network address in the registration data storage unit, and to determine the correction condition by accessing the first image processing script identifier associated with the first network address in the registration data storage unit.

2. The data processing apparatus according to claim 1, wherein the image correction processor comprises:
   a subject image extraction unit configured to extract the background image and the subject image from the image data; and
   a background image processing unit configured to correct the extracted background image and generate corrected image data to include the subject image.

3. The data processing apparatus according to claim 1, wherein the subject image extraction unit comprises an extraction unit configured to allocate pixels of the image data to corresponding blocks, extract the background image and the subject image from the image data by using an image characteristic of each of the blocks, and store the extracted background image and subject image in a memory.

4. The data processing apparatus according to claim 2, wherein the background image processing unit comprises a background image correction unit configured to delete a block distinguished as the background image and specify a color value for the background image, or resize a size of background image data to a size of the image data to combine the background image with the subject image in layers.

5. A non-transitory computer readable storage medium storing instructions which when executed on a data processing apparatus causes the data processing apparatus to execute the steps of:
receiving and storing at least one network address in association with at least one image processing script identifier;
receiving a correction request through a network, the correction request comprising image data, a first network address, and a first image processing script identifier;
analyzing the correction request including the image data;
selecting a correction processing to be performed in a background image processing unit according to the first image processing script identifier included in the correction request;
extracting a background image and a subject image from the image data;
generating corrected image data to include the subject image by correcting the extracted background image according to the selected correction processing, wherein the correcting step includes deleting a block distinguished as the background image and specifying a color value for the background image, or resizing a size of background image to a size of the image data to combine the background image with the subject image in layers;
transmitting the corrected image data through the network; and
storing the corrected image data such that the image data is associated with the corrected image data.

6. The data processing apparatus according to claim 2, further comprising a browser processor configured to allow a user to browse the image data and the corrected image data through the network.

7. The data processing apparatus according to claim 2, wherein the data processing apparatus, which is a CGI server, an application server, or a SOAP server, allows a user to browse the image data and the corrected image data through the network and receives the correction request from a web server device externally connected to the network.

8. An image registration method performed by a data processing apparatus to register image data to the data processing apparatus through a network, comprising the steps of:
receiving and storing at least one network address in association with at least one image processing script identifier;
receiving a correction request from a terminal device through the network, the correction request comprising image data, a first network address, and a first image processing script identifier;
dividing the image data into background image data and subject image data by analyzing the image data;
storing the background image data and the subject image data in a memory;
correcting the background image data stored in the memory, wherein the correcting step includes deleting a block distinguished as the background image data and specifying a color value for the background image data, or resizing a size of background image data to a size of the image data to combine the background image data with the subject image data in layers;
generating corrected image data to include the subject image data according to an image processing script corresponding to the received first image processing script identifier;
storing the corrected image data in the memory;
receiving a registered image display request through the network;
examining whether or not the corrected image data is registered in the database by analyzing the registered image display request; and
displaying the corrected image data when the corrected image data is registered or the image data without correction when the corrected image data is not registered.

9. The image registration method according to claim 8, wherein the image data is corrected by being subjected to correction processing according to a setting of a service site.

10. The image registration method according to claim 8, wherein the image data is transmitted in an EXIF format, and the corrected image data is generated using the image data written in the EXIF format.

11. The image registration method according to claim 8, wherein the data processing apparatus receives the image data after the image data is subjected to pre-processing comprising at least one of white balance adjustment, color saturation correction, sharpness adjustment, contrast adjustment, distortion correction, image size adjustment, and noise elimination.

12. The image registration method according to claim 8, wherein the corrected image data is generated by superimposing decoration data on the background image data.

13. The image registration method according to claim 8, wherein the corrected image data is generated after separating the background image data and the subject image data by using an image characteristic of the background image data.

14. The image registration method according to claim 8, further comprising the steps of:
setting a wait condition to receive the correction request from a service site through the network;
acquiring the image processing script identifier and the image data from the correction request when the correction request is received;
selecting one of objects to be called according to an image processing script associated with the image processing script identifier; and
defining the image data as an instance of the object.

15. The image registration method according to claim 14, wherein the correction request is received from a service site, and the corrected image data is transmitted to the service site as a response.

16. The non-transitory computer readable storage medium according to claim 5, further comprising instructions which cause the data processing apparatus to correct the color value of the background image to a predetermined color value, and to combine the background image having the predetermined color value with the subject image in layers.

17. The non-transitory computer readable storage medium according to claim 5, further comprising instructions which cause the data processing apparatus to perform the step of allowing a user to browse the image data and the corrected image data through the network, wherein the correction request is received from a web server device externally connected to the network.

* * * * *